UNITED STATES PATENT OFFICE.

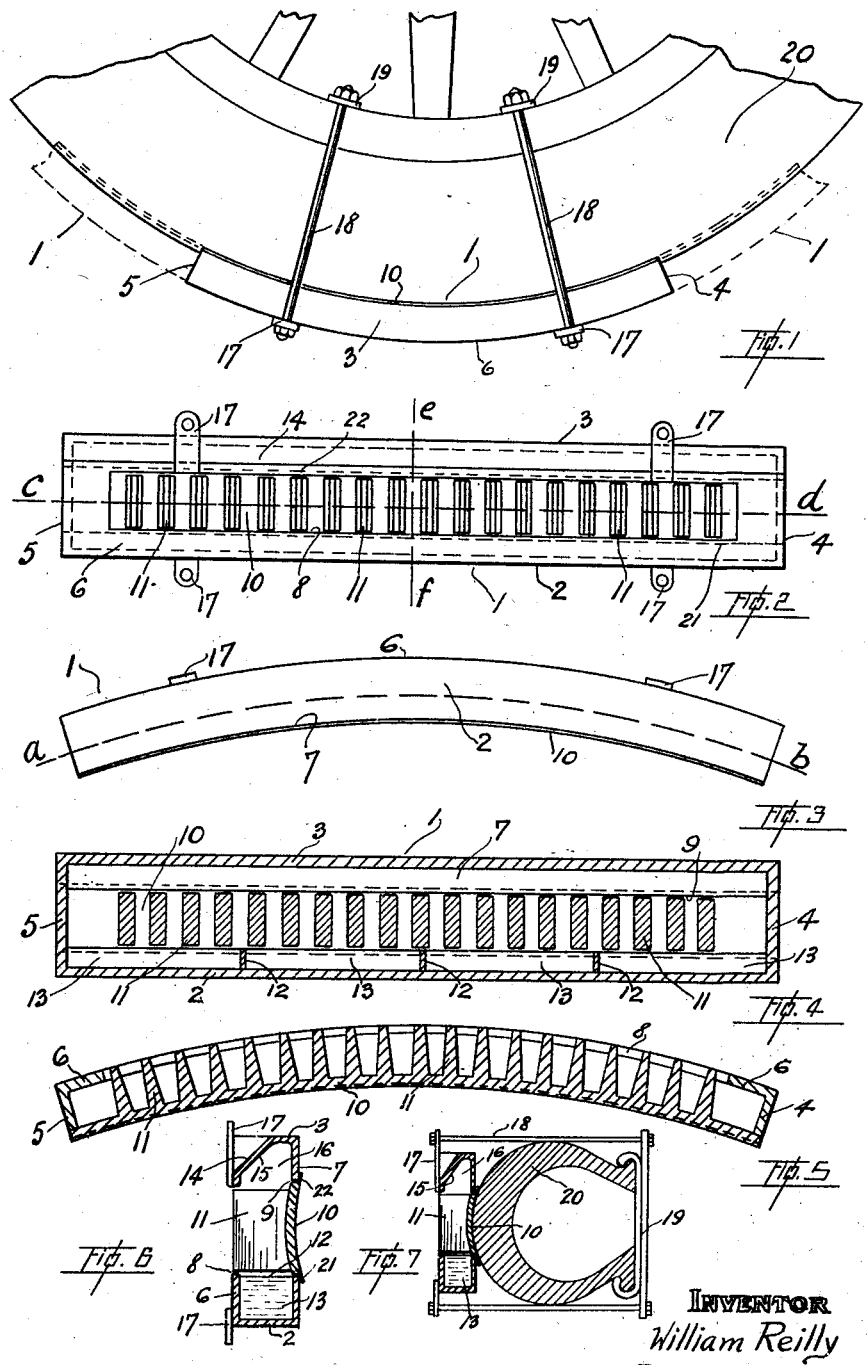

WILLIAM REILLY, OF KERRISDALE, NEW BRUNSWICK, CANADA.

VULCANIZER.

1,407,771.  Specification of Letters Patent.  Patented Feb. 28, 1922.

Application filed March 1, 1918. Serial No. 219,820.

*To all whom it may concern:*

Be it known that I, WILLIAM REILLY, a subject of the King of Great Britain, and a resident of Kerrisdale, in the Province of British Columbia, Canada, have invented certain new and useful Improvements in Vulcanizers, of which the following is a specification.

My invention relates to improvements in vulcanizers with particular reference to vulcanizers for vulcanizing the casings or shoes of pneumatic tires, and the object of my invention is to provide a device of this character in which, when in operation, the maximum heating efficiency is obtained and applied effectively over the whole area to be vulcanized. A further object is to devise a vulcanizer which is simple in construction and which is unlimited as to its scope of operation, that is to say, while it may separately be used to close punctures or blowouts or cure surface cuts, bruises or other imperfections at local points on a tire casing, it may be used with equal facility in plurality in sufficient numbers to extend completely around the casing so that the same may be retreaded at one operation.

I attain these objects by the construction illustrated in the accompanying drawings in which—

Fig. 1 is a view illustrating the practical application of my invention.

Fig. 2 is a plan view of the device.

Fig. 3 is a side view of the device.

Fig. 4 is a sectional plan view taken on the line *a—b* of Fig. 3.

Fig. 5 is a longitudinal section, taken on the line *c—d* of Fig. 2.

Fig. 6 is a transverse section of the device taken on the line *e—f* of Fig. 2.

Fig. 7 is a view, in cross section, showing the device applied to a tire casing.

Similar figures of reference indicate similar parts throughout the several views.

The device consists of a substantially rectangular box-shaped frame 1, curved longitudinally, as shown in Figs. 3 and 5, and having its sides and ends closed by the side walls 2 and 3 and end walls 4 and 5. The top and bottom sides 6 and 7 of the frame are provided with rectangular openings 8 and 9 respectively, and in the bottom opening 9 is disposed a removable plate 10 curved longitudinally to correspond with the curvature of the frame and transversely to suit the curve of the tire casing, which plate is provided on its upper surface with a plurality of spaced ribs 11, the upper ends of which ribs extend into the opening 8 in the top side of the frame. The ribs 11 may be parallel sided, but they are preferably made tapering towards their upper ends as shown in Fig. 5, and the plate 10 which carries them, while it may be formed as a separate removable element, as described, may be made integral with the frame to form a non-removable bottom side therefor. When made removable the plate is provided with flanges 21 and 22 which extend beyond the edges of the opening 9 and project below the bottom of the frame, as shown in Fig. 6, so that the surface of the plate only comes in contact with the casing when the device is in operation. 12 indicates partitions formed within the frame on one side of the same, these partitions dividing the longitudinal compartment 13 formed by the side wall 2 and the portions of the top and bottom sides 6 and 7 respectively on one side of the openings 8 and 9, as shown in Figs. 4 and 6, while the side wall 3, on the opposite side of the openings 8 and 9, is inclined inwardly for a portion of its height, as shown at 14 in Fig. 6, to form a deflecting surface 15 within the compartment 16 on the side of the frame opposite to compartment 13.

17 indicates lugs carried by the frame through which bolts 18 may be passed and by means of which and clamp plates 19 the device may be secured on edge in operative position on a casing 20, as shown in Figs. 1 and 7, the casing being placed on its side while the vulcanizing process is being carried out.

Having thus indicated the principal parts of my invention I will now describe briefly its operation.

When it is desired to vulcanize a portion of the tire the wheel is laid flat and the device applied thereto and secured in position by means of the bolts 18 and clamp plates 19, the vulcanizer being then on edge with the compartment 16 on top and the subdivided compartment 13 underneath. Combustible fluid is then placed in as many of the sub-divisions of the compartment 13 as are required and ignited, whereupon the flames and hot gases therefrom will impinge on the plate 10 and ribs 11 and pass over the same up into compartment 16 to be deflected back on the plate and ribs again by the deflecting surface 15, and thus the ribs are subjected to the direct upward heat from the ignited fluid and to the return heat from the compartment 16, from which will be seen that the maximum heat is utilized and directed effectively on the vulcanizing plate 10. The operation is the same when the tire casing is being re-treaded, in which case, instead of one vulcanizer only being used, a sufficient number to surround the casing are applied thereto end to end as indicated in Fig. 1, and secured in position as described. Combustible fluid is then placed in the compartments 13 of all the vulcanizers and ignited, thus carrying out the vulcanizing process all around the casing at the same time and enabling the same to be retreaded in an expeditious and economical manner.

What I claim as my invention is:—

1. A vulcanizer comprising a body having a vulcanizing face arc-shaped longitudinally to fit the tread of the tire circumferentially and adapted to be applied upon the tread when the tire is flat on its side face, a fuel compartment extending at the lower side from end to end of the body and following the arc thereof and a heat deflecting hood formed at the longitudinal upper side and following the arc of the body whereby an opening is left opposite the vulcanizing face and the heat arising from the fuel compartment is temporarily confined and a pocket of heated gas formed previous to its passing away through the opening.

2. A vulcanizer comprising a body having a vulcanizing face arc-shaped longitudinally to fit the tread of the tire circumferentially and adapted to be applied upon the tread when the tire is flat on its side face, a fuel compartment extending at the lower side from end to end of the body and following the arc thereof and a heat deflecting hood formed at the longitudinal upper side and following the arc of the body whereby an opening is left opposite the vulcanizing face and the heat arising from the fuel compartment is temporarily confined and a pocket of heated gas formed previous to its passing away through the opening and a series of spaced ribs disposed transversely parallel to each other on the outer side of the vulcanizing face and in alignment from end to end of the same.

3. A vulcanizer comprising a body having a vulcanizing face arc-shaped longitudinally to fit the tread of the tire circumferentially and adapted to be applied upon the tread when the tire is flat on its side face, a fuel compartment extending at the lower side from end to end of the body and following the arc thereof and a heat deflecting hood formed at the longitudinal upper side and following the arc of the body whereby an opening is left opposite the vulcanizing face and the heat arising from the fuel compartment is temporarily confined and a pocket of heated gas formed previous to its passing away through the opening, and means for holding the longitudinal arc-shaped body against the tread with the vulcanizing face substantially vertical and close pressed to the tread from end to end when the tire is laid flat.

4. The device of claim 1 in which the vulcanizing face of the device is curved both longitudinally and transversely.

5. In a vulcanizer, a substantially rectangular box-shaped frame curved longitudinally having an opening in its top side of less width than the frame whereby a fuel compartment and a heat-deflecting compartment are formed respectively along its interior opposite longitudinal sides, the bottom of said frame for a portion of its width projecting beyond the remainder to form a longitudinally and transversely curved vulcanizing plate, and a plurality of spaced ribs secured transversely to the inner face of said plate portion and disposed between the said compartments.

6. In a vulcanizer, a substantially rectangular box-shaped frame curved longitudinally having an opening in its top side of less width than the frame whereby a fuel compartment and a heat-deflecting compartment are formed respectively along its interior opposite longitudinal sides, said frame having an opening in its bottom side, and a transversely ribbed plate adapted to be inserted into the bottom opening so that its ribs extend between the said compartments, said plate being curved longitudinally and transversely.

7. In a vulcanizer, a substantially rectangular box-shaped frame curved longitudinally having an opening in its top side of less width than the frame whereby a fuel compartment and a heat-deflecting compartment are formed respectively along its interior opposite longitudinal sides, said frame having an opening in its bottom side, and a transversely ribbed plate adapted to be inserted into the bottom opening so that its ribs extend between the said compartments, said plate being curved longitudinally and transversely and provided with flanges engaging the bottom side of the said frame.

8. In a vulcanizer, a substantially rectangular box-shaped frame curved longitudinally having an opening in its top side of less width than the frame whereby a fuel compartment and a heat-deflecting compartment are formed respectively along its interior opposite longitudinal sides, said frame having an opening in its bottom side, a plate adapted to be inserted into the bottom opening and provided on its inner face with a plurality of spaced ribs, said plate being curved longitudinally and transversely and said ribs being tapered inwardly towards their points and adapted to extend between said compartments into the top side opening.

9. A vulcanizer comprising a body having a longitudinally arcuate face conforming to the curvature of the tire tread, a fuel compartment formed on the lower side of the body and extending throughout its length, a reflector extending inwardly from the upper longitudinal edge of the body in angular relation with respect to the side wall to form an air chamber immediately above the fuel compartment having an opening to the interior of the body, said chamber affording a momentary confinement of the heat arising from the fuel compartment and producing a pocket of heated air immediately contiguous the vulcanizing face, prior to its passage through said opening.

10. A vulcanizer comprising a body having a longitudinally arcuate vulcanizing face conforming to the tread of the tire and applied to the latter when it is flat on its side face, a fuel compartment formed at the lowermost side of the body and extending throughout its length, a deflector extending from the longitudinal edge of the uppermost side of the body and projecting outwardly and downwardly from its side wall to effect an air chamber immediately above the fuel compartment, having an opening to the exterior of the body, said chamber affording a momentary confinement of the heat arising from the fuel compartment and producing a pocket of heated air immediately contiguous to the vulcanizing face, prior to its passage through said opening, and a plurality of ribs transversely situated in spaced and aligned relation within said chamber to provide a series of heat passageways and supplemental radiating surfaces.

Dated at Vancouver, B. C., this 14th day of February, 1918.

WILLIAM REILLY.

Certificate of Correction.

It is hereby certified that in Letters Patent No. 1,407,771, granted February 28, 1922, upon the application of William Reilly, for an improvement in "Vulcanizers," an error appears requiring correction as follows: In the grant and in the heading to the printed specification the residence of the patentee is erroneously given as " Kerrisdale, New Brunswick, Canada," whereas said residence should have been given as *Kerrisdale, British Columbia, Canada;* and that the said Letters Patent should be read with this correction therein that the same may conform to the record of the case in the Patent Office.

Signed and sealed this 29th day of August, A. D., 1922.

[SEAL.]
KARL FENNING,
*Acting Commissioner of Patents.*